C. D. Page,

Lime Kiln.

No. 3877. Reissued Mar. 8. 1870.

Witnesses:
R. F. Dyer
Geo. W. Mitt

Inventor:
C. D. Page
By J. Fraser & Co
attys

United States Patent Office.

CLARK D. PAGE, OF ROCHESTER, NEW YORK.

*Letters Patent No.* 22,239, *dated December* 7, 1858; *reissue No.* 3,877, *dated March* 8, 1870.

IMPROVEMENT IN LIME-KILNS.

The Schedule referred to in these Letters Patent and making part of the same

*To all whom it may concern:*

Be it known that I, CLARK D. PAGE, of the city of Rochester, county of Monroe, and State of New York, did invent a certain new and useful Improvement in Lime-Kilns; and I do hereby declare that the following is a full and exact description thereof, reference being had to the accompanying drawings making part of this specification, in which—

Figure 1:
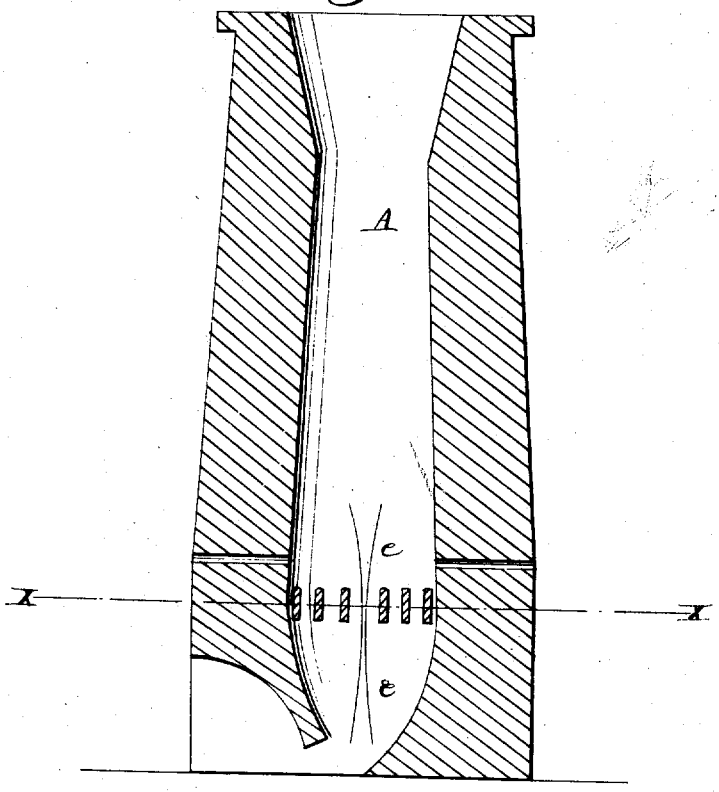

Figure 1 represents a vertical section of my improved lime-kiln, and

Figure 2:
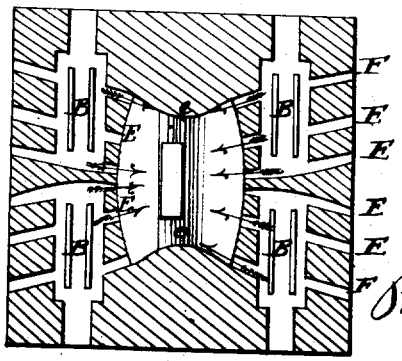

Figure 2, a horizontal section of the same, in the plane of line *x x*, fig. 1.

Like letters of reference indicate corresponding parts in both figures.

My invention consists in so arranging the flues as to concentrate the heat toward the center of the kiln; also, in constructing the interior of the kiln with convex swells or checks on the sides, at right angles to the flues, for the purpose of more effectually concentrating the heat at those points most difficult to reach.

In the drawings—

A represents the kiln;

B B, the furnaces; and

E E, the flues that conduct the heat from the furnaces to the interior of the kiln.

These flues, instead of all opening straight into the kiln, as in other arrangements, enter diagonally, or in an inclined position, concentrating toward the center.

By this means the heat all tends toward one point, and entering from opposite sides, the currents meet and commingle at the center, and reach that portion of the limestone that is not effectually reached in common lime-kilns.

In this manner, a high and equable temperature is maintained throughout the body of limestone opposite the flues, producing a thorough calcination of the whole mass.

The interior of the kiln at the sides, at right angles to the flues, is formed with swells or checks *e e*, continuing for a short distance above and below the flue-space, when they are gradually merged into the general curve of the interior of the kiln.

The object of these swells is to give additional effect to the heating of the interior of the limestone mass, by deflecting the air inward, that enters through the outer flues E E, and carrying it around to those sides furthest removed from the fires.

In entering from either side, the heat strikes into the mass of limestone in the angle beyond, and effectually calcinates it.

The construction of the shaft of the kiln at this point also renders the convergence of the flues E E most effective in striking through the mass.

What I claim as my invention, and desire to secure by Letters Patent, is—

1. The flues F arranged tangentially, and the flues E arranged radially, in combination with the furnace B and the calcining-chamber A, substantially as and for the purpose described.

2. The convex swells *e* and *d*, on the inner sides of the kiln, at right angles to the flues, substantially as and for the purpose described.

C. D. PAGE.

Witnesses:

R. F. OSGOOD,

GEO. W. MIATT.